United States Patent [19]
Lemelson

[11] 3,779,446
[45] Dec. 18, 1973

[54] WELDING APPARATUS

[76] Inventor: Jerome H. Lemelson, 85 Rector St., Metuchen, N.J. 08840

[22] Filed: Oct. 13, 1971

[21] Appl. No.: 189,018

Related U.S. Application Data

[63] Continuation of Ser. No. 797,899, Feb. 10, 1969, abandoned, which is a continuation-in-part of Ser. No. 362,870, April 27, 1964.

[52] U.S. Cl. .................... 228/15, 72/112, 72/317, 228/2
[51] Int. Cl. ............................................. B23k 37/00
[58] Field of Search .................... 228/2, 15; 72/112, 72/118, 317

[56] References Cited
UNITED STATES PATENTS

| | | | |
|---|---|---|---|
| 2,226,852 | 12/1940 | Dobrick | 72/317 |
| 2,998,646 | 9/1961 | Hitz | 29/470 |
| 3,002,871 | 10/1961 | Tramm et al. | 228/2 X |
| 3,040,427 | 6/1962 | Howell | 29/474.3 |
| 3,234,646 | 2/1966 | Hollander et al. | 29/470.3 |
| 3,429,028 | 2/1969 | Maropis et al. | 29/470.1 |
| 3,504,425 | 4/1970 | Sutovsky et al. | 228/2 X |

*Primary Examiner*—Richard B. Lazarus

[57] ABSTRACT

A welding apparatus and method are provided which are particularly applicable to the welding of aligned and abutted sections of pipe and tubing. In one form, welding is effected by a spinning tool which heats and deforms portions of tube work members such as the flanged or abutted ends of tubing in a manner to weld same together. The apparatus and method are also applicable to the welding of shapes other than tubing.

In another form, the aligned ends of two tubes are simultaneously or sequentially automatically flared prior to the welding operation which involves abutting the flared end portions and welding same together by spinning or cold pressure welding apparatus.

5 Claims, 8 Drawing Figures

INVENTOR.
JEROME H. LEMELSON

WELDING APPARATUS

RELATED APPLICATIONS

This is a continuation of application Ser. No. 797,899 filed Feb. 10, 1969 and now abandoned which is a continuation-in-part of copending application Ser. No. 362,870 filed Apr. 27, 1964, and entitled Welding Tool and Method, said copending application having as a parent application Ser. No. 519,015 filed June 28, 1955, and entitled Welding Techniques.

SUMMARY OF THE INVENTION

This invention relates to apparatus and methods for welding two members such as aligned tubing or pipe made of metal or other thermoplastic material which is capable of being welded together by so-called molecular bonding or fusion of portions of said material. Various non-ferrous metals such as aluminum, copper, titanium and the like may be cold pressure welded together by employing suitably shaped dies to compress one article against the other in a manner to cause the cold flow and molecular bonding of portions of metal of the two members. It is also known in the art to molecularly bond both ferrous and non-ferrous metals together by so-called friction welding techniques which have heretofore been generally applied to rods and tubes which are brought into endwise abutment with each other as they are relatively rotated about their longitudinal axis so as to frictionally heat material at the ends of the two members and effect the welding thereof. While friction welding techniques have been applied successfully to the welding of many members, nevertheless, they exhibit certain shortcomings such as the need to suitably support the members to be welded to prevent their buckling or bending during the welding operation. Accordingly, many shapes and materials may not be suitably friction welded due to their inherent shortcomings.

It is, accordingly, a primary object of this invention to provide new and improved welding apparatus and methods for welding two or more members such as lengths of tubes and pipes together without the need for depositing welding material.

Another object is to provide a new and improved apparatus and method for welding two members by means of a rotating tool applied so as to both heat and predeterminately deform portions of the members to cause the molecular bonding or welding thereof.

Another object is to provide a welding apparatus for welding the flanges of work members together by friction means without the necessity of moving or rotating said members once they are abutted together.

Another object is to provide an improved apparatus for friction welding abutted tubes or plates together by means of a rotating tool brought to bear against the interface portions of the abutting members and operated in a manner to frictionally melt material of both said members while the members are compressed together so as to cause the intermingling of said materials and the molecular bonding thereof when they solidify.

Another object is to provide an apparatus for welding the ends of two aligned tubes which includes means for automatically flaring said tube ends prior to the welding operation.

Another object is to provide a new and improved apparatus and method for spin welding the abutted ends of two aligned tubes.

With the above and such other objects in view as may hereafter more fully appear, the invention consists of the novel constructions and arrangements of parts as will be more fully described and illustrated in the accompanying drawings, but is to be understood that changes, variations and modifications may be resorted to which fall within the scope of the invention as claimed.

Figure 1:
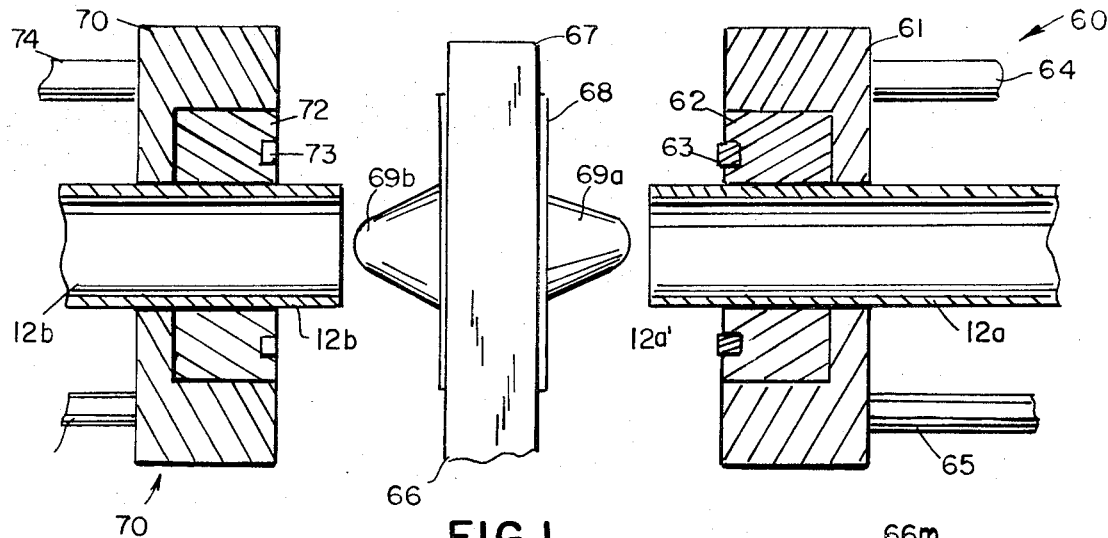
FIG. 1 is a side elevational view with parts broken away and sectioned for clarity of an apparatus for aligning sections of tubing to be welded, flaring the end portions of said tube sections and welding same in a single continuous operation.

Referring now to the drawings, there is shown in FIG. 1 an apparatus 60 which includes means for aligning and holding two sections of pipe or tubing, simultaneously or sequentially flaring the ends of said aligned tubing and thereafter abutting and welding the flared ends together. The tubes 12a and 12b to be welded may be made of suitable metal or thermoplastic polymers capable of being deformed and molecularly bonded or pressure welded together by the proper application of force and die means thereto. Tube 12a is shown having its end portions 12a' protruding outwardly from the face of a pressure welding die 62 which is held in a die frame or support 61 by friction and prevented from longitudinal displacement therein. The die 62 and support 61 may be made in accordance with the teachings found in said parent application Ser. No. 362,870 wherein said die and frame are split and adapted to be frictionally engaged against the outside surface of the tube 12a and locked upon properly positioning said tube in the die cavity or bore. The die holder 61 is supported by a plurality of rods or shafts 64 and 65 which extend from one or more supports which may include a lineal actuator (not shown) such as a lineal electric motor, hydraulic or pneumatic ram which is longitudinally controllable in its operation to perform the operations hereafter described. The die 62 is provided with a circular rim or ridge 63 circumscribing the opening therein and the tube 12a.

A second tube 12b is similarly supported in a die 72 which is supported by a holder or mount 71 which, like holder 61 is also supported by a plurality of rods 74 and 75 connected to a lineal actuator or other suitable support means to operate the apparatus as hereafter described. A portion 12b' of the tube 12b protrudes outwardly from the face of die 72 which holds tube 12b securely in place against longitudinal displacement by friction means as described in the operation of die 62 and further details of the die 72 and supporting means therefore may also be found in said application Ser. No. 362,870.

The die 72 is provided with a circumscribing channel 73 concentric with the bore therethrough in which tube 12b is frictionally held. The channel 73 serves to effect cold pressure welding of deformed portions of the tube as described hereafter.

Prior to the welding operation, a deforming tool 66 is brought into alignment with the ends of the tubes 12a and 12b and the apparatus 60 is operative to outwardly flare the ends 12a' and 12b' of the two tubes, said end portions being thereafter welded together by the cooperative action of the circumscribing ridge 63 of die 62 and the circumscribing cavity 73 of die 72 which serve to cause a circular band-like portion of the metal of the flared end of tube 12a to flow into and molecular bond with a circular band-like portion of the metal of the flared end of the tube 12b. The flared ends of tubes 12a and 12b may also be frictionally welded together by compressing and spinning either or both of the assemblies holding said tubes or may be resistance or ultrasonically welded together after the flaring tool is removed from between the die assemblies as shown in FIG. 1.

Figure 2:
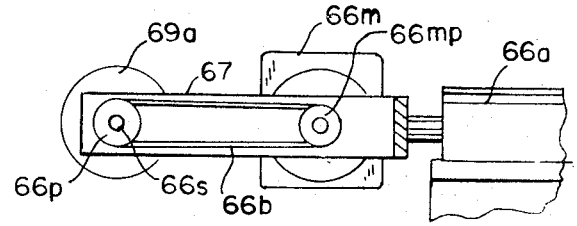
FIG. 2 is an end elevational view of a portion of the flaring tool provided in FIG. 1, with parts broken away for clarity and parts added.

In FIG. 2 is shown an end view of the tube flaring or deforming tool 66 which includes an arm 66' preferably formed or a plurality of structural channels or castings of sufficient rigidity to rotationally support a shaft 66s in bearing at one end thereof which shaft mounts a drive pulley 66p and the respective flaring tools 69a and 69b at the ends thereof. The pulley 66p is disposed between said tools 69a and 69b preferably within the frame or arm 66' and a drive belt 66b winds around the pulley 66p and a second pulley 66mp disposed on the output shaft of a gear motor 66m which is supported by the arm 66'. Thus, as motor 66m operates, it drives a belt 66b which in turn rotates the flaring tools 69a and 69b as the pulley 66p thereof is rotated.

To retract the tool 66 from between the dies 61 and 71 after it has operated to flare the ends of the tubes disposed in said dies so as to permit the tubes to be welded together, a lineal actuator or motor 66a has its shaft 66a' operatively connected to the assembly including frame or arm 66' and when actuated to project or retract, is operative to project or retract the entire assembly including arm 66', motor 66m and tool units 69a and 69b disposed at the end of the arm. When the assembly of FIG. 2 is fully projected, the forming tools 69a and 69b thereof are preferably in alignment with the ends of tubes 12a and 12b as shown in FIG. 1 and may operate to effect flaring of the ends of said tubes.

The hub 68 from which the flaring nose portions or members 69a and 69b protrude may be rotated on a shaft supported by the base 67 by means of a belt, chain or gear drive (not shown) at the suitable speed necessary to effect proper flaring of the tubing ends. Flaring may be effected by moving the assembly 66 first against one protruding tube end and thereafter against the other tube end, by movement of the assemblies 60 and 70 which clampingly hold the respective tubes or by a combination of movements of both the flaring tool and the retainers for the tubes. In a preferred operation, assemblies 60 and 70 are simultaneously moved axially towards each other after the flaring tool 66 has been positioned therebetween as illustrated so as to simultaneously effect the flaring of both tubes. This operation may be effected by simultaneously feeding and automatically loading a tube length into each of the opened or separated dies or die assemblies which thereafter are closed by servo motor or fluid cylinder means to clampingly engage their respective tubes as illustrated. Separation of the assemblies 60 and 70 immediately after effecting flaring is automatic to permit removal of the flaring tool from its position between the tubes so that the flared ends of each tube may be thereafter abutted and welded as described.

Other forms and modes of the embodiment illustrated in FIG. 1 include: (a) Rotation of the flaring tool assembly 68 may be effected by air pressure in which air is effected from a nozzle (not shown) against turbine blades or formations in the periphery of the base 68. (b) Flaring nose portions 69a and 69b may be secured to opposite ends of the shaft of a motor comprising the base 68 mounted on support 66 as shown. (c) The flaring tool nose portions 69a and 69b may be of such a characteristic and operative as the result of their engagement with the inside surfaces of the ends of the respective tubes to prepare said surfaces by removing oxide films and other impurities therefrom so as to be most effectively pressure welded thereafter. If pressure welding is effected immediately after such flaring operation, there will not be ample time for oxide film to develope on the newly flared surfaces to impair such welding and it will not be necessary to otherwise treat or prepare the flared surfaces which engage each other so as to effect proper pressure welding. (d) Flaring may also be effected without rotation of the tool head 68 by compressively engaging the nose portions of the tool against the protruding portion of the tubing by its movement or by movement of the assemblies 60 and 70 towards each other. (e) The assemblies illustrated in FIG. 1 may be used as a flaring tool per se or a combined flaring and welding tool. If the circular die tip 63 which protrudes from the face of die 62 interferes with the flaring operation, it may be retracted and advanced during flaring and welding respectively or may be provided as a separate element movable automatically into the position illustrated upon the separation of the holding fixtures after flaring. (f) The tube sections 12a and 12b may be respectively held by other means not illustrated to prevent their longitudinal displacement during flaring or prevented from said movement by frictional engagement of their outer surfaces upon closure of the split dies or clamps 62 and 63. (g) If the tubes 12a and 12b are made of thermoplastic polymers, they may be flared by the means illustrated as the result of friction resulting from the rotational engagement of the tool nose portions 69a and 69b and/or by heating the flare forming nose portions 69a and 69b to soften the polymer upon engagement with respective surfaces thereof. Resistance heating means may be provided within 68 whereupon it will not be necessary to spin the nose assembly but to merely compressively engage the ends of the respective tubes with the forming noses in a program controlled forming cycle which may also include welding to the ends of the tubes so flared. The cycle may be operative such that the assemblies will separate after the ends of the thermoplastic tubing have been softened by heat and flared, the tool 66 removed and the flared ends brought together while the material is still semi-molten or in a condition such that compression of the flared portions together will effect their welding assembly. (h) A tool assembly and arrangement of the type illustrated in FIG. 1 may be used to flare or expand the end of one aligned tube without so affecting the other so that the expanded end will telescope over the non-formed end of the other tube and may be sealed or welded thereto upon longitudinal movement of the assemblies 60 and 61 together after the tool effecting said expanding is removed from the position illustrated. Any of the hereinabove described techniques applied to tube flaring may be used to expand the end of said one tube (by properly shaping the nose portion used to expand or flare the tube end). Welding may be effected by compressively engaging the end of the tube not flared against the inflected portion of the expanded or flared tube end to pressure or fusion weld the two together by means described hereafter. The flaring or expanding tool may also be operative to apply an adhesive or solvent vented through the nose used to expand the tube at a predetermined time during the flaring or expanding cycle whereby, when the tube ends are brought together thereafter upon removal of the flaring or expanding mandrel therefrom, bonding of the telescoping surfaces may be effected. The flaring and bonding operation may be automatically controlled to effect the desired results.

In still another embodiment, it is noted that pressure welding as described may be replaced or supplemented by one or more forms of welding including resistance welding, ultrasonic welding, spinn welding. Spin welding may be effected by rapidly rotating either or both assemblies 60 and 70 to cause the flared or expanded ends of the tubing to abut and become frictionally welded together. By properly designing and mounting the dies 62 and 72, they may be provided to electronically heat seal weld or resistance weld the flared or expanded ends of the tubing together.

Figures 3, 4:
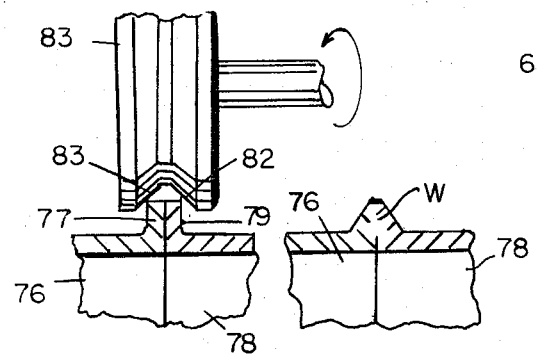
FIG. 3 is a partial end view of the welding apparatus operative to effect friction or pressure welding of two abutted components.
FIG. 4 is a sectioned view of a portion of two articles welded together by the means of FIG. 3.

In FIG. 3 and 4, means are provided for welding the flared ends of tubing or abutted portions of sheeting or plate together by rotating a flared wheel or welding tool against the abutted tubing flared portions or sheet edging and relatively moving the rotating tool to deform and friction or resistance weld said abutted members together. In FIG. 3 a portion of a welding tool 80 is shown which tool includes a disc 81 of metal or other suitable material which is rotated at sufficient speed and brought to bear against abutted edges of sheet or the periphery of abutted tubing flared portions 77 and 79 which circumscribe respective tubes 76 and 78. The central portion of the disc 81 is shaped with a groove 82 having tapered inside walls 83 and 84 which are operative to engage the flanges or sheets 77,78 and compress same together as the disc 81 rotates at high speed. Welding may be effected by a combination of pressure and frictional heat generated by the rotational engagement of surfaces 83 and 84 against the outer surfaces of 77 and 79. The rotating disc 81 is guided in a path along the rims of the abutted surface members and compressed against the assembly with sufficient force to effect fusion welding of the two members and deformation of the edging thereof as illustrated in FIG. 4. Notation W refers to the welded portion of the abutted members, which in the case of flared tubing, circumscribes the flared portions to effect a fluid seal. In a preferred form of the invention, the abutted assembly is rotated by rotating both assemblies 60 and 70 or one of said assemblies while the other free wheels so as to pass at least 360° of the flared portions through the rotating wheel groove to effect said circumscribing weld. In other forms of the invention, the abutted members and/or the wheel may be moved longitudinally with respect to each other and auxilliary welding means may also be employed to enhance, improve or speed up welding. For example, the wheel 81 may be ultrasonically vibrated by coupling an ultrasonic transducer thereto and vibrating same. The wheel may also be a resistance heating electrode or resistance welding electrode adapted to impart heat to the abutted sheets as the wheel rotates so as to reduce the time necessary to weld the abutted edging together.

In the apparatus of FIGS. 1 to 4, the speed of rotation of the work pieces relative to each other or of the tool relative to the abutted workpieces to be welded will depend on the material comprising the pieces to be welded and the dimensions of the parts or tubes being welded. Heating phase pressures for low carbon steels will vary, for example, from 3,000 to 20,000 p.s.i. and forging pressures will range from 5,000 to 25,000 pounds per square inch. In other words, the welding cycle will include a pre-welding phase in which the parts are heated by friction resulting from their relative movement or the rotation of the welding tool thereagainst followed thereafter by an increase in pressure between the parts to effect welding of the surfaces so heated.

If parts 76 and 78 are flanged sheets or plates, they may be abutted against a platen which resists the force exerted by the rotating wheel. If said parts are tubing or pipe, a mandrel may be disposed inside thereof to support both tubes during welding force application to the flanges 77 and 79 or the tubes may be held close to the faces of both dies and compressively engaged against each other to reduce the degree of deflection thereof during welding. Auxilliary heating means for the pipe may also be employed including (a) induction heating of the flanged ends of the tubes as the periphery of the spinning wheel 81 is brought against the periphery of the flanges, flame heating said flanged portions 77 and 79, resistance heating the flanged portions 77 and 79 by providing the wheel 81 as an electrode in a circuit including parts 76 and 78 which are grounded. In the latter arrangement, shaft 84 on which wheel 81 rotates is provided with means for commutating electrical energy to the wheel and a program control means may be utilized to apply and/or vary said energy in accordance with a predetermined cycle which includes control of such other variables as the speed of rotation of wheel 81, movement of assembly 80 and/or the work to cause the spinning wheel to engage and compressively forge formations 77,79 together, travel of the assembly 80 to weld a length of the flange assembly, engagement and movement of the parts 76 and 78 together, release of said parts and/ if applicable, possible rotation of at least one of the parts relative to the other. Coupling of the tool 80 and/or the work assembly to an ultrasonic transducer may also be effected to cause or enhance welding of the parts as the tool rotates thereagainst.

Figures 5, 6:
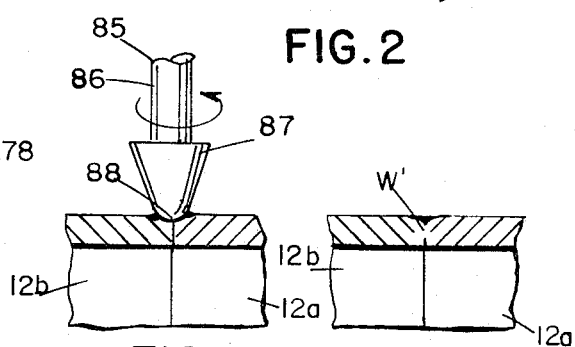
FIG. 5 is a side view of a portion of abutted work members and a tool operative for welding same by means of heat generated by friction.
FIG. 6 is a fragmentary view in cross section of abutted articles welded by the means shown in FIG. 5.

In FIGS. 5 and 6 welding apparatus is illustrated for butt welding the ends of tubing, plates or other assemblies by means of a rotating tool generating frictional heat in the area where parts are abutted. The procedure preferably also includes compressively engaging the parts so as to facilitate welding. The tool 85 is shown as a mandrel 87 rotated on a shaft 86 the longitudinal axis of which is disposed normal or oblique to the abutted surfaces to be welded as compared to rotation about an axis parallel to the surfaces being joined. The mandrel 87 and the rounded nose 88 thereof is preferably made of a material which will wear very slowly such as tungsten carbide, boron nitride, etc. Prior to welding, the parts to be welded, denoted 89 and 90 are shaped to abut each otherand are clamping engaged and retained together as shown. The welding tool 85 is then positioned and moved so that the nose end 88 thereof is brought to bear against both pieces where they abut each other and rotated at high speed while compressively engaging the assembly to generate sufficient heat to cause melting of material of both members adjacent the abutted interface. Upon fusion of the molten material, a weld results between the two members. As the tool rotates, it is maintained in compressive engagement with the abutted work at or adjacent the interface and is moved at predetermined speed longitudinally along said interface to effect an extended weld W' or fusion of at least a portion of the thickness of the tubing or sheet wall as shown. Again, the assembly may be supported from below or within by a mandrel or bucking plate to prevent deflection or permanent bending of the parts.

Figure 7:
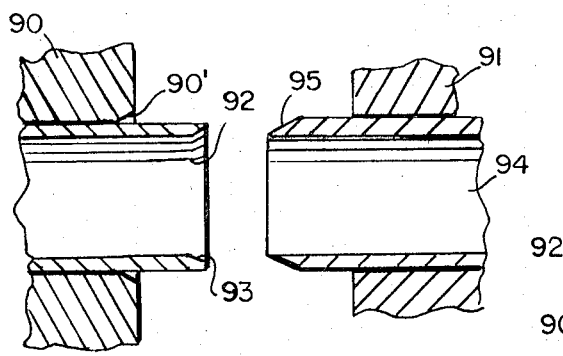
FIG. 7 is a side view in cross section of a portion of an apparatus for deforming and welding aligned abutted portions of tubing.
Figure 8:
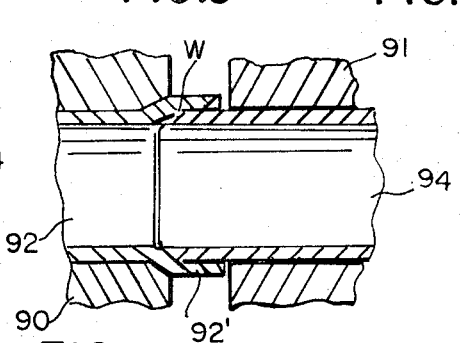
FIG. 8 shows portion of the tubing of FIG. 7 in cross section and welded together.

FIGS. 7 and 8 illustrate another means for effecting the frictional welding of tubing or pipes aligned in abutment with each other. The ends of two tubes 92 and 94 are illustrated axially aligned with each other and each clampingly retained by respective assemblies 90 and 91 adapted to chuck or otherwise clampingly secure each tube in place as shown with a portion of each tube overhanging or extending beyond the faces of each support. The tubes are preferably each held by their respective supports in a manner to prevent axial movement of each during the friction welding procedure to be described. Two friction welding procedures are noted. The first procedure involves rotating either of the supports 90 or 91 while maintaining the other stationary so as to rotate the tube held thereby about its longitudinal axis and advancing either the rotating or non-rotating support to cause the ends of the tubes to engage each other. In the first procedure, the end portion of tube 94 is adapted to be worked into the inside of the other tube and to thereby expand the end of tube 92 outwardly as the result of the combination of relative rotation of the tubes and their longitudinal movement together. The tubes have their ends shaped so that one may work its way inside the other in a manner to cause an expansion or flaring of the end portion of the tube into which the other is worked and with the generation of sufficient frictional heat to cause friction welding of the two tubes about a peripheral interface. The inside surface 93 of the end of tube 92 is shown conically tapered outwardly to receive the inwardly tapered outer surface 95 of the end of tube 94 and to permit the latter to work its way into the interior of tube 92 as shown in FIG. 15. Notation 90' refers to the tapered end of the opening defined through clamp or chuck member 90 against which the end of tube 92 deforms and is bucked just prior to fusion welding the end surface 95 thereto as illustrated. In order to prevent buckling of the end of tube 94, it is preferably of greater strength than the end of tube 90 by virtue of it being of a greater wall thickness, harder or hardened material or less susceptible to inward deformation than the end of tube 92 which is preferably outwardly deformed or expanded by a combination of working by spinning and softening of the material thereof as the result of frictional heat. In this respect, the interior of tube 94 may be supported by a mandrel or ring inserted therein prior to spin welding or by the application of sufficient internal fluid pressure during welding or a combination of these operations or may be cooled to maintain the material of tube 94 more rigid than the frictionally heated material of the end of tube 92 which is not so cooled after the end of tube 94 is inserted into and worked along the end of 92. The flow of an internally applied coolant liquid or gas through the abutted tubes may be initiated automatically after the tubes are sealingly engaged by abutment as they are welded or worked.

In another form of the invention, the tube ends need not be worked one inside the other but may be butt welded together by engaging the ends of each tube and relatively spinning one against the other at sufficient speed and with the application of sufficient force to compress the tube ends together to effect their butt welding together. If the two tubes are relatively heavy walled, their ends may be faced normal to the longitudinal axis of each tube. However, for lighter walled tubes, the ends may be chamfered or tapered to permit welding the two together along conical surfaces. While the ends of each tube may be tapered at the same conical angle, the provision of different conical tapers will permit one surface to gradually work its way against the other in a manner to effect a substantially greater radial force to fusion bond or spin weld the two together when the necessary temperature and pressure has been reached. Coating the end of at least one of the tubes with a solder or brazing material will permit friction soldering or brazing of the tubes together at lower pressures and temperatures than would be necessary for friction welding metals such as ferrous metal together. Similarly, a solder welding or brazing material ring may be disposed between the two members to be heated and melted by friction as at least one of the tubes rotates and to effect friction soldering, brazing or welding. Solder, welding or brazing material disposed between two rods or other shapes may similarly be used to effect brazing, soldering or welding by friction means when the parts are relatively rotated. The material may be coated, or otherwise bonded to one of the members prior to engagement or flowed in powder or liquid state just as or during the engagement of the two members together as they relatively rotate. A groove, grooves or serrations in at least one of the mating surfaces may retain the solder, brazing or welding material or to flow said material under pressure or by capillary action during relative rotation of the parts to be welded. If the parts or at least one part is of a sintered metal or matrix containing welding material, such material may be made molten as the result of frictional heat and may be caused to flow and/or effect welding or bonding of the two members without resort to great pressures.

Further bonding or welding techniques applicable to the apparatus and methods hereinabove described and illustrated in FIGS. 1 to 8 are noted as follows.

Auxilliary steps which are suppliment to those described may include: (a) provision of controlled means for automatically flowing molten metal, welding, brazing or soldering material between or against the mated parts as they are frictionally heated and at a time when the temperature of the parts has reached a predetermined degree so as to effect molecular bonding or welding of the parts. Generally this temperature will be in the range of or above the melting point of the welding or bonding material. Such flow may be effected while the part or parts are rotating or immediately after relative rotation has stopped and the welding, brazing or soldering material may be so directed and force flowed as to fill the interfacial volume between parts and to bond to both parts upon cooling. Powdered metal, alloys, ceramic, glass or polymers may also be caused to fill the interface between or adjacent rotating parts being welding or flow adjacent or over the welded parts and melted or fused thereagainst by the heat generated by friction spinning to either effect bonding or protect the welding parts from heat or other corrosion generated during welding or thereafter. The timing and flow of said auxilliary material may also be controlled by the same cycle controller controlling the other mentioned variables. (b) Another variable controllable by the welding cycle controller is flow of coolant through the pipes being joined by friction welding and/or adjacent the exterior surfaces of the parts being welding in the area of the weld so as to rapidly cool the parts after welding their surfaces together to shorten the cycle time and the time required to maintain the parts in their respective clamping fixtures. (c) In still another variation, the welding tool such as described heads 81 or 87 may contain electronic means such as a semiconducting means employing the Peltier effect to effect the rapid transfer of heat thereto when energized by an electrical input so as to effect cooling of surrounding areas or material coupled thereto. Such as thermoelectric cooling device may be provided in heads 81 or 87 or other auxilliary devices adapted to engage the work in the area of the weld after welding or melting of the mated parts so as to rapidly cool and fuse same and the energization of said cooling device or devices may be controlled to occur at a predetermined point or points in a welding cycle to effect the desired results under the control of the same cycle controller controlling the other variables. Or the friction welding tool may be vented and operative to have a work cooling fluid passed therethrough at a predetermined time during a welding cycle by electrically controlled means controlled by said cycle controller. Auxilliary welding means such as electrical resistance welding, ultrasonic welding, or heating, induction heating or heating, etc. may be applied to the procedures described hereinabove by coupling a transducer to the described tools and operating same under the control of a cycle controller as described to yield the desired results in conjunction with the action of frictionally heating and deforming the mated work pieces as described. (d) Said described cycle controlled techniques for cooling the area of the weld may also be applied to other forms of welding to yield predetermined results and reduce cycle welding time.

I claim:
1. Apparatus for joining tubing together comprising:
means for engaging and holding a first tube of deformable material near an end thereof,
means for engaging and holding a second tube of deformable material near an end thereof with an open end of said second tube aligned with and spaced apart from an open end of said first tube,
a deforming tool having a rotary deforming head,
means for locating said deforming tool between the open ends of said first and second tubes and in alignment with said first tube and means for effecting powered rotation between said head and first tube to cause said rotary head to engage and to outwardly spin deform the end of said first tube,
means operative thereafter for abutting and welding the ends of said first and second tubes together.

2. An apparatus in accordance with claim 1 including means for operating said deforming tool to deform the ends of both said tubes prior to the welding operation.

3. An apparatus in accordance with claim 1 including means for abutting said head as it is rotated to spin deform the end of the other of said tubes, means for relatively moving said tool and said tubes to remove the tool from the vicinity of the ends of said tubes prior to the abuttment of the tube ends together and the welding operation.

4. An apparatus in accordance with claim 1 wherein said deforming tool has opposed portions for simultaneously engaging the ends of both said tubes, means for simultaneously rotating said opposed portions of said tool simultaneously against respective ends of said tubes to outwardly spin deform said tube ends, means for relatively removing said tool from between said tube ends prior to abutting and welding the ends of said tubes together.

5. Apparatus for joining tubing together comprising:
means for engaging and holding a first tube of deformable material near an open end thereof,
means for engaging and holding a second tube of deformable material near an open end thereof and in alignment with and spaced apart from said open end of said first tube,
a deforming tool having opposed portions shaped to engage and deform the respective aligned open ends of said first and second tubes, means for simultaneously rotating said opposed portions of said tool while simultaneously engaging said opposed portions against respective ends of said tubes to outwardly spin deform the walls of the ends of both said tubes, means for relatively moving said tool from between said tubes after spin deforming same and means for abutting and welding the deformed ends of said tubes together.

* * * * *